United States Patent
Yoshii et al.

(10) Patent No.: US 8,036,459 B2
(45) Date of Patent: Oct. 11, 2011

(54) IMAGE PROCESSING APPARATUS

(75) Inventors: Hideki Yoshii, Tokyo (JP); Shuichi Kagawa, Tokyo (JP); Jun Someya, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 568 days.

(21) Appl. No.: 12/249,734

(22) Filed: Oct. 10, 2008

(65) Prior Publication Data

US 2009/0208099 A1   Aug. 20, 2009

(30) Foreign Application Priority Data

Feb. 14, 2008 (JP) ................. 2008-032884

(51) Int. Cl.
*G06K 9/00* (2006.01)
(52) U.S. Cl. .......... 382/167; 382/168; 382/274
(58) Field of Classification Search .......... 382/167, 382/168, 169, 274; 358/521, 522
See application file for complete search history.

(56) References Cited

U.S. PATENT DOCUMENTS

| | | | |
|---|---|---|---|
| 4,984,071 A * | 1/1991 | Yonezawa | 358/522 |
| 6,694,051 B1 * | 2/2004 | Yamazoe et al. | 382/167 |
| 7,006,668 B2 * | 2/2006 | Iguchi et al. | 382/108 |
| 7,085,008 B2 * | 8/2006 | Weldy | 358/1.9 |

FOREIGN PATENT DOCUMENTS

| | | |
|---|---|---|
| JP | 2002-51229 A | 2/2002 |
| JP | 2002-092607 A | 3/2002 |
| JP | 2004-342030 A | 12/2004 |
| JP | 4011122 B2 | 9/2007 |
| JP | 2008-301341 A | 12/2008 |
| WO | WO-2008/149525 A1 | 12/2008 |

* cited by examiner

*Primary Examiner* — Phuoc Tran
(74) *Attorney, Agent, or Firm* — Birch, Stewart, Kolasch & Birch, LLP (57) ABSTRACT

An image processing apparatus enhances contrast without producing color balance distortion or color collapse by generating a gradation-scale correction table from a distribution of a characteristic quantity of an input image signal, using the gradation-scale correction table to derive a gradation correction parameter for each pixel from a maximum component value of the pixel, and multiplying all components of the pixel by the gradation correction parameter.

13 Claims, 9 Drawing Sheets

IMAGE PROCESSING APPARATUS

BACKGROUND OF THE INVENTION

1. Field of the Invention

The present invention relates to an image processing apparatus.

2. Description of the Related Art

A conventional image display apparatus disclosed by Nakahigashi et al. in Japanese Patent Application Laid-open No. 2004-342030 improves the contrast of an input signal with components representing values of the three primary colors red, green, and blue by generating a luminance signal from the input signal, generating a gradation-scale correction table from the luminance signal, and multiplying the red, green, and blue component values by a ratio derived from the gradation-scale correction table.

There are two general methods for improving the contrast of a video signal. One general method is to separate the video signal into a luminance component and a color component (e.g., a luminance signal and a pair of color difference signals) and perform a gradation correction on the luminance component. In this method, there is a tendency for increased luminance levels to produce faint colors (colors with low saturation) and reduced luminance levels to produce deep colors (with high saturation). To prevent this occurrence, a gradation correction is sometimes also performed on the color signal (color difference signals), but this may cause the problem of color collapse, in which differences between color gradation levels are lost.

The other general method is to perform the gradation correction on the primary color components of the image signal, normally red, green, and blue, typically using the same gradation-scale correction table independently for each color component. A problem with this method is that it distorts color balance, because the different primary color components of each pixel tend to be corrected by different amounts.

The method disclosed by Nakahigashi et al. combines both of these general methods. By multiplying each of the primary color values of a picture element (pixel) by the same ratio (correction parameter) it avoids distortion of color balance, but since the correction parameter is derived from luminance information, the corrected value of a color component may greatly overshoot the maximum gradation limit, causing severe color collapse.

SUMMARY OF THE INVENTION

An object of the present invention is to improve contrast without distorting color balance and without causing severe color collapse.

The invention provides an image processing apparatus for processing an image signal representing a plurality of pixels. The image signal includes a plurality of component values for each pixel.

A maximum component value detector detects, for each pixel, a maximum value among the plurality of component values.

A distribution extractor extracts a distribution from the input image signal over a predetermined period.

A gradation-scale correction table generator generates a gradation-scale correction table from the distribution. The gradation-scale correction table represents a gradation correction parameter decision curve.

By referring to the gradation-scale correction table, a gradation correction parameter calculator calculates a correction parameter for each pixel from the maximum component value of the pixel.

A multiplier multiplies the component values of the pixel by the correction parameter.

Distortion of color balance is prevented by using the same correction parameter for all component values of each pixel.

Color collapse is prevented by deriving the correction parameter of a pixel from the maximum component value of the pixel, so that the correction parameter does not cause any component value of the pixel to overshoot the maximum value on the gradation correction parameter decision curve.

DETAILED DESCRIPTION OF THE INVENTION

Embodiments of the invention will now be described with reference to the attached drawings, in which like elements are indicated by like reference characters.

Embodiment 1

Figure 1:
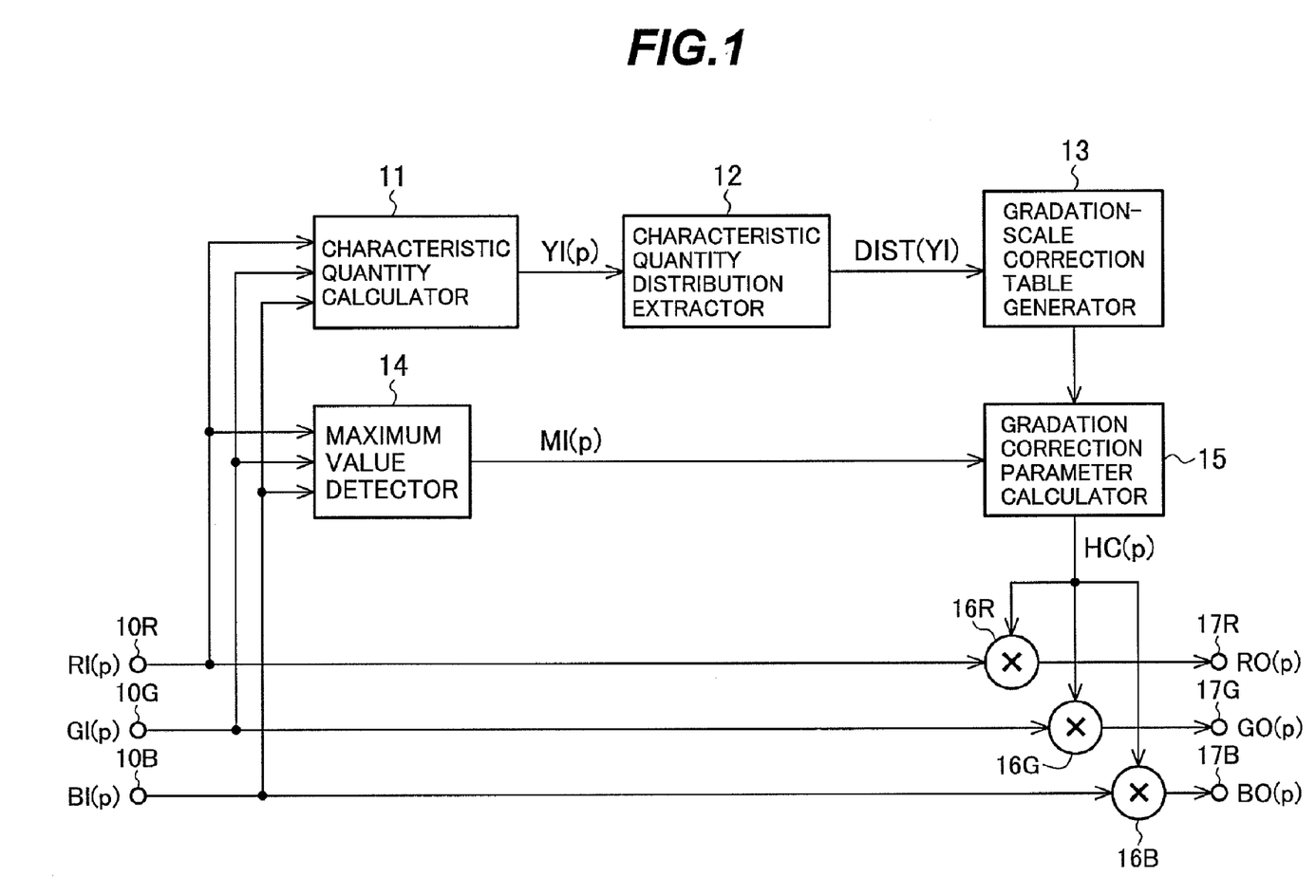
FIG. 1 is a block diagram illustrating the structure of an image processing apparatus according to Embodiment 1 of the invention.

Referring to FIG. 1, the image processing apparatus includes input terminals 10R, 10G, 10B, a characteristic quantity calculator 11, a characteristic quantity distribution extractor 12, a gradation-scale correction table generator 13, a maximum value detector 14, a gradation correction parameter calculator 15, multipliers 16R, 16G, 16B, and output terminals 17R, 17G, 17B.

The input terminals 10R, 10G, 10B receive an image signal in a prescribed format used in television and computers. The image signal is divided into frames, each representing one image or screen of, for example, a moving picture. The image signal has a plurality of components. In the present example, these components are red, green, and blue primary color components.

For each pixel represented by the image signal, the characteristic quantity calculator 11 calculates a characteristic quantity from the primary color components RI, GI, BI of the pixel as received at the input terminals 10R, 10G, 10B and outputs the result to the characteristic quantity distribution extractor 12.

The characteristic quantity distribution extractor 12 extracts a distribution from the characteristic quantities received from the characteristic quantity calculator 11 over one frame. The extracted distribution is supplied to the gradation-scale correction table generator 13.

The following description will proceed on the assumption that the characteristic quantity is the luminance YI. The characteristic quantity calculator 11 calculates the luminance YI(p) of each pixel (p), and the characteristic quantity distribution extractor 12 extracts the luminance distribution DIST (YI).

From the luminance distribution DIST(YI) obtained by the characteristic quantity distribution extractor 12, the gradation-scale correction table generator 13 generates a gradation-scale correction table storing data representing a gradation correction parameter decision curve. The gradation-scale correction table may be updated, for example, once per frame. Each time the characteristic quantity distribution extractor 12 extracts the distribution over one frame, the gradation-scale correction table generator 13 generates a gradation-scale correction table for that frame.

The gradation correction parameter decision curve plots the relationship between the characteristic quantity before and after the gradation correction that will be applied. This curve might therefore be termed a characteristic quantity gradation correction curve, but in the present invention, the curve is used to correct signal values (such as the component values of the input image signal) other than the characteristic quantity, so the term 'gradation correction parameter decision curve' is more appropriate.

The gradation-scale correction table stores corrected values of the characteristic quantity as data at addresses given by the uncorrected values of the characteristic quantity.

In this embodiment, the gradation correction parameter decision curve has a comparatively steep slope in any gradation range where the luminance YI distribution has a comparatively high density.

The maximum value detector 14 detects a maximum component value for each pixel. The maximum component value is the maximum one of the input image signal component values of the pixel. In the example under discussion, the maximum value detector 14 detects the maximum one of the three primary color signal values RI(p), GI(p), BI(p) for each pixel input to the input terminals 10R, 10G, 10B in real time and outputs the result as the maximum component value MI(p).

If the gradation values RI(p), GI(p), BI(p) of the red, green, and blue primary color signals of a pixel (p) are 10, 20, and 30, for example, (RI(p)=10, GI(p)=20, BI(p)=10), the maximum value detector 14 outputs MAX(RI(p), GI(p), BI(p))=30 as the maximum component value MI(p).

The detected maximum component value MI(p) is supplied to the gradation correction parameter calculator 15. Using the maximum component value MI(p), the gradation correction parameter calculator 15 calculates a gradation correction parameter (correction coefficient) HC(p) by referring to the gradation-scale correction table generated in the gradation-scale correction table generator 13 and outputs the result to the multipliers 16R, 16G, 16B.

The multipliers 16R, 16C, and 16B multiply the red, green, and blue primary color signal values RI(p), GI(p), BI(p) by the correction coefficient HC(p) calculated by the gradation correction parameter calculator 15, and output the results to the output terminals 17R, 17G, 17B.

A more specific example of the image processing apparatus in FIG. 1 will now be described in detail.

The characteristic quantity calculator 11 calculates a luminance value YI(p) from the primary signal values RI(p), GI(p), BI(p) of each pixel in real time and outputs the result. The luminance value may be calculated using a generally known equation.

Figure 2:
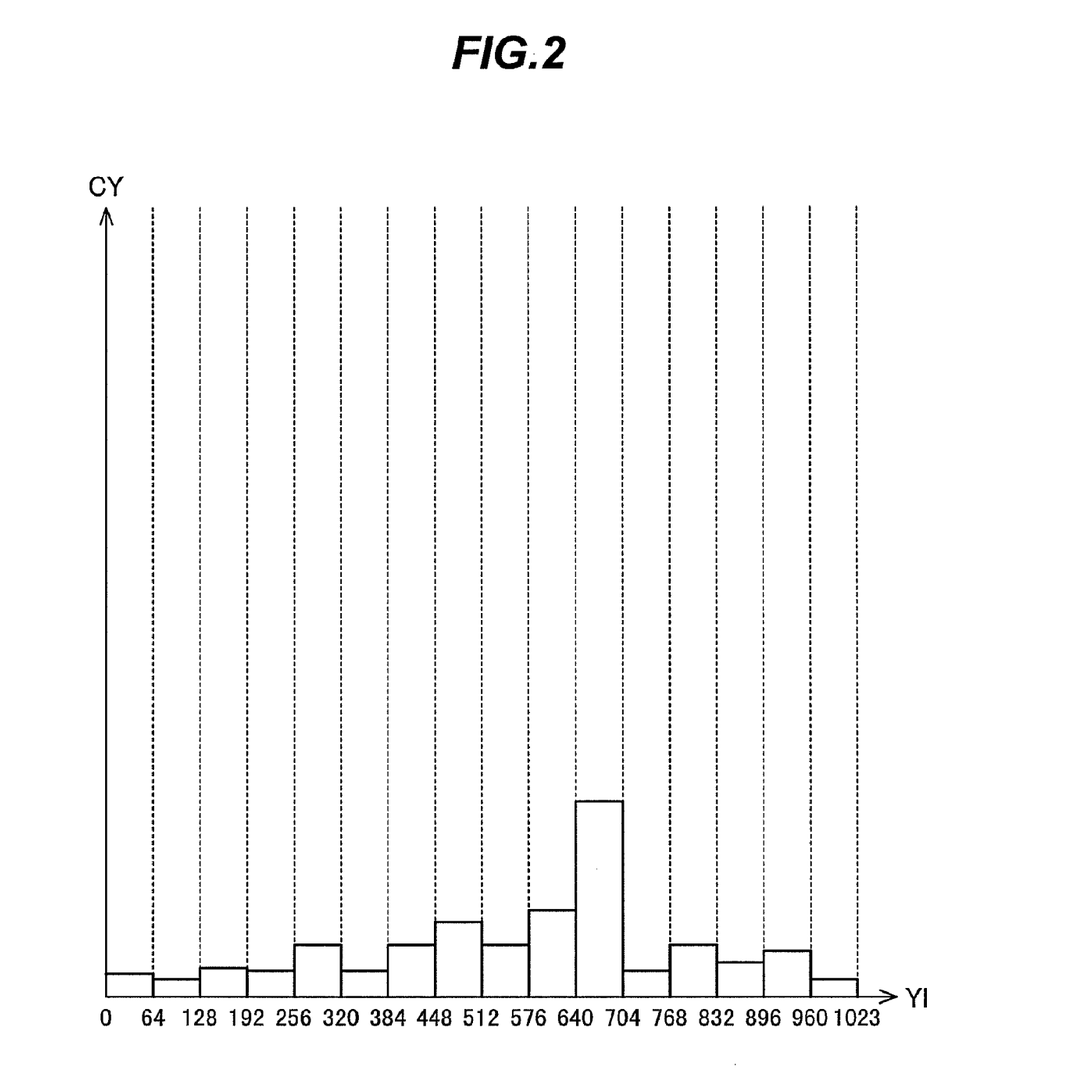
FIG. 2 is a graph illustrating an exemplary distribution of characteristic quantities detected in the image processing apparatus in Embodiment 1.

If one screen (frame) has one million pixels, for example, the characteristic quantity distribution extractor 12 constructs a histogram of the luminance gradation values YI of the one million pixels, and outputs the extracted result DIST(YI). The histogram may indicate the frequency of each gradation level (showing 256 frequencies if there are 256 gradation levels, or 1024 frequencies if there are 1024 gradation levels); alternatively, the histogram may indicate frequencies of classes each consisting of a plurality of gradation levels. For example, frequencies may be obtained for sixteen or thirty-two classes of gradation levels. FIG. 2 shows an exemplary histogram that divides 1024 gradation levels into sixteen classes of sixty-four levels each. The sixteen frequency values (CY) constitute the extracted distribution DIST(YI).

The gradation-scale correction table generator 13 converts the characteristic distribution DIST(YI) received from the characteristic quantity distribution extractor 12 to a table of data representing the gradation correction parameter decision curve.

Figure 3:
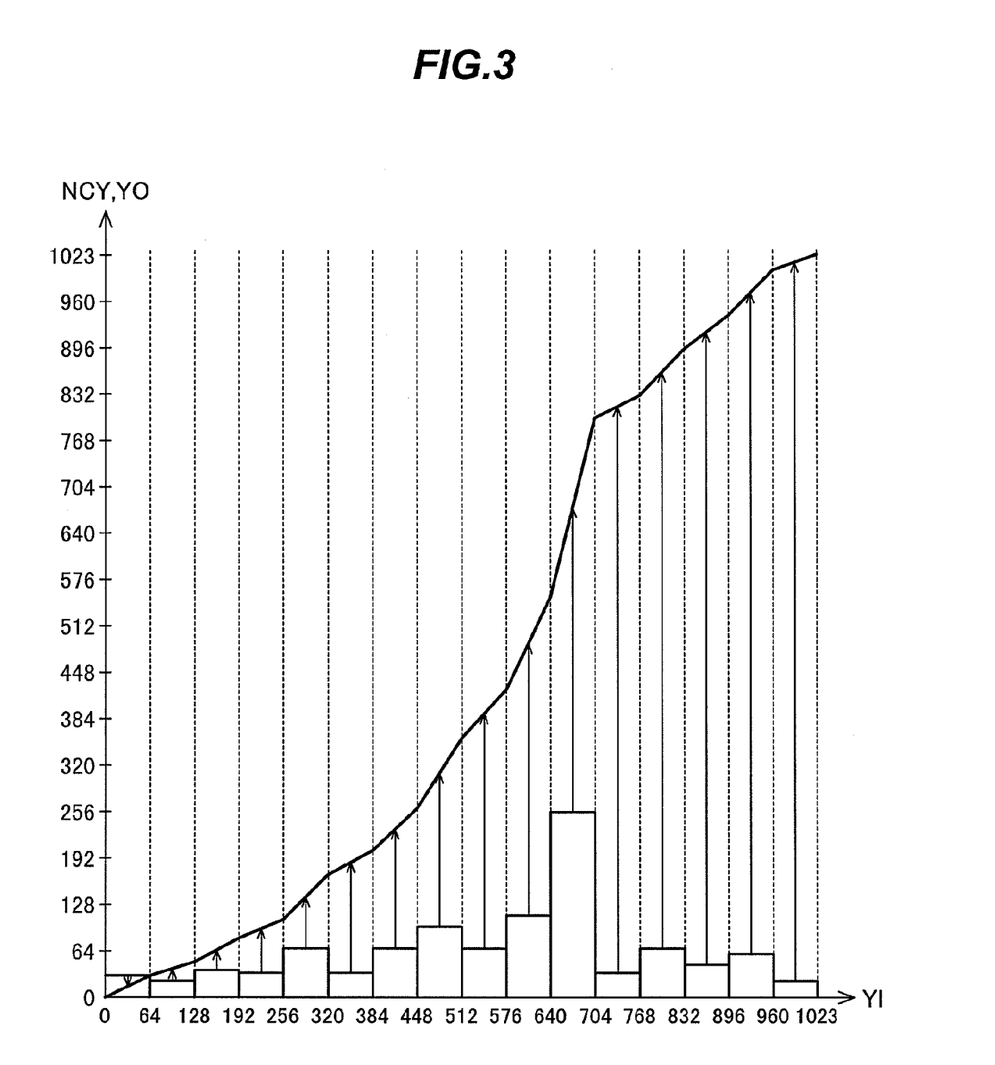
FIG. 3 is a graph shows an exemplary gradation correction parameter decision curve generated in the image processing apparatus in Embodiment 1.

FIG. 3 shows an exemplary gradation correction parameter decision curve derived from the sixteen-class histogram in FIG. 2. The horizontal axis of the graph in FIG. 3 indicates gradation values (luminance gradation values YI) of the input characteristic quantity. The vertical axis indicates the frequency NCY of each class, normalized so that the total frequency of the sixteen classes is equal to the maximum gradation (1023 in this example). The curve above the frequency bars indicates the cumulative frequency YO, which is obtained by summing the normalized frequency values from left to right, that is, from the minimum class to the maximum class. The curve is shown as a broken line or polyline starting at zero in the bottom left and ending at the maximum value (1023) in the top right.

The broken line is plotted by linking points with vertical coordinates representing the cumulative sum at each class and horizontal coordinates representing the maximum value in the class. This broken line is the gradation correction parameter decision curve.

The normalization is performed by multiplying the frequencies or cumulative sums by the maximum value of the gradation range divided by the number of pixels in one frame (in this example, 1023/1,000,000).

The gradation correction parameter decision curve plotted in this way has a comparatively steep slope at classes or in gradation regions with comparatively high frequencies, where the distribution of the characteristic quantity has a comparatively high density, and has a more gentle slope at classes or in gradation regions where the distribution of the characteristic quantity has a comparatively low density. Provided this condition is satisfied, the gradation correction parameter decision curve may be plotted by a method other than the method described above.

The gradation correction parameter decision curve may be limited by setting a lower limit or an upper limit on the slope of the curve. If this is done, then each change in the curve made to conform to the slope limit should be balanced by a compensating change in another part of the curve, where the slope is already within the limit, so that the curve still ends at a cumulative sum equal to the maximum gradation value (1023). In other words, if the frequency of a class is increased or decreased to conform to the limit, a compensating frequency adjustment should be made in another class or other classes.

The gradation correction parameter calculator 15 receives from the gradation-scale correction table generator 13 a table of data representing the gradation correction parameter decision curve and obtains a correction parameter HC(p) for each pixel. In the example in FIG. 3, the table consists of sixteen cumulative sums representing the cumulative histogram.

The multipliers 16R, 16G, 16B respectively multiply the red, green, and blue primary color signal values RI(p), GI(p), BI(p), for example, received at the input terminals 10R, 10G, 10B by the correction coefficient HC(p), and output the resulting corrected signals RO(p), GO(p), BO(p).

Figure 4:
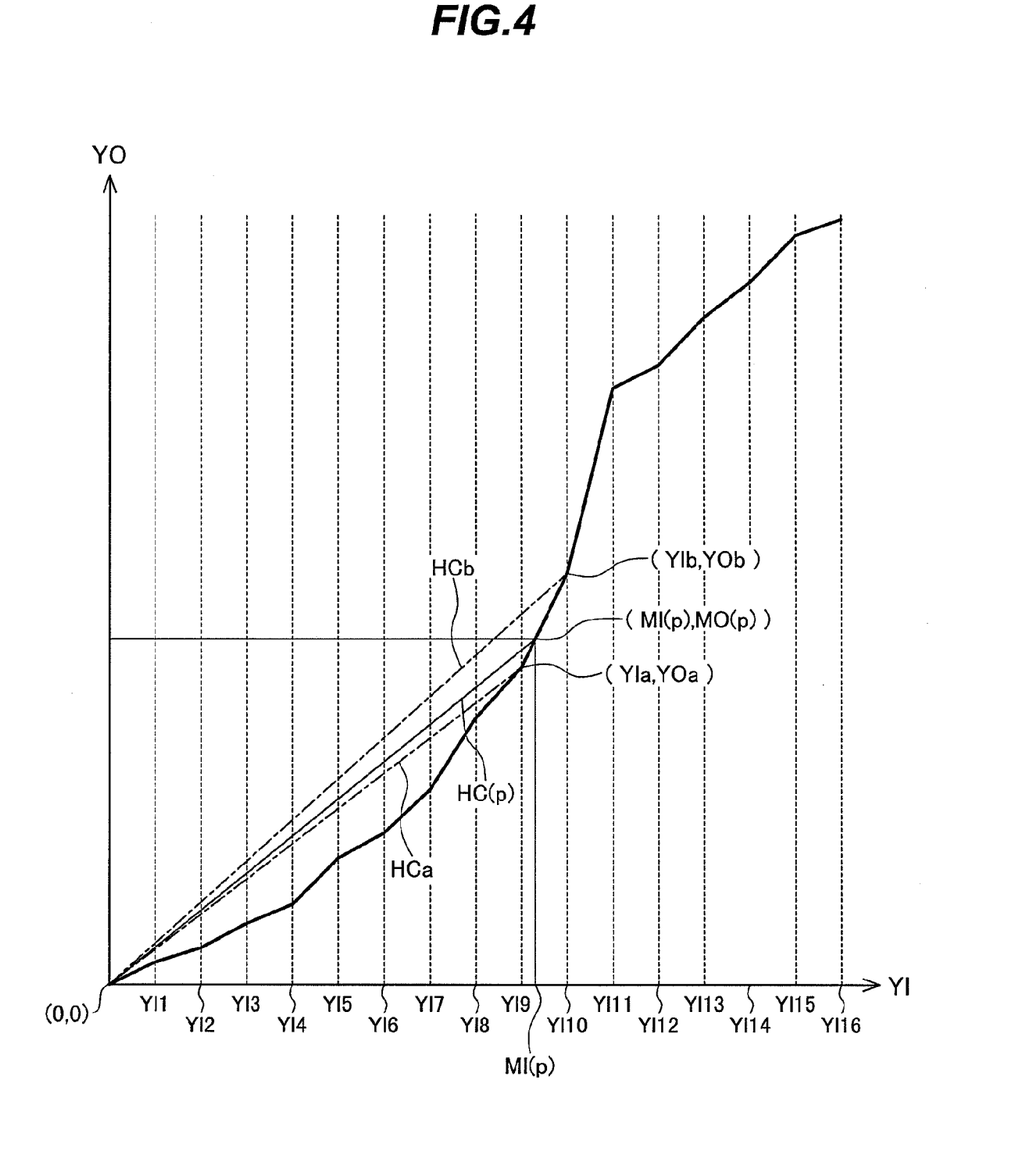
FIG. 4 is a graph illustrating an exemplary computation of gradation correction parameters in the image processing apparatus in Embodiment 1.

An exemplary method of calculating correction coefficients HC(p) in the gradation correction parameter calculator 15 will be described with reference to FIG. 4. In FIG. 4, the horizontal axis indicates pre-correction luminance gradation values YI, and the vertical axis indicates post-correction luminance gradation values YO. The curve extending from the lower left to the upper right is the same gradation correction parameter decision curve as in FIG. 3.

The horizontal coordinate values YI1, YI2, . . . , YI16 represent address values in the gradation-scale correction table; the vertical coordinate values YO1 YO2, . . . , YO16, represent the corresponding values on the gradation correction parameter decision curve, and are stored in the gradation-scale correction table at these addresses.

When the gradation correction parameter calculator 15 receives the maximum component value MI(p) of a pixel (p) from the maximum value detector 14, it uses the maximum component value MI(p) to obtain a correction parameter from the curve in FIG. 4.

If MI(p) equals one of the sixteen YIn values (YI1 to YI16 in FIG. 4), the gradation correction parameter calculator 15 reads the corresponding YOn value from the table generated by the gradation-scale correction table generator 13, and outputs the ratio of YOn to YIn as the correction coefficient HC(p). That is, $$HC(p)=HCn=YOn/YIn$$

If MI(p) is not equal to any YIn, then MI(p) is situated between two consecutive values YIa and YIb, where b is an integer from 1 to 16 and a is the next lower integer (a=b−1). That is, NI(p) belongs to the class with maximum value being YIb. The gradation correction parameter calculator 15 outputs the value given by equation (1) below as the correction coefficient HC(p) in this case.

$$HC(p)=HCa\times\{MI(p)-YIa\}/\{YIb-YIa\}+HCb\times\{YIb-MI(p)\}/\{YIb-YIa\} \quad (1)$$

Equation (1) indicates that HC(p) is obtained by linear interpolation between the correction parameter HCb (=YOb/YIb) for the maximum value YIb in the class to which the maximum component value MI(p) belongs and the correction parameter HCa (=YOa/YIa) for the maximum value YIa in the next lower class, according to the difference between MI(p) and YIa and the difference between MI(p) and YIb.

That is, if MI(p) is between YIa and YIb as shown in FIG. 4, the slope of the line connecting the origin (0, 0) to the point (MI(p), MO(p)) obtained by internally dividing the line connecting point (YIa, YOa) and point (YIb, YOb) in the ratio of (MI(p)−YIa) to (YIb−MI(p)) is obtained by using the slope HCa (=YOa/YIa) at point (YIa, YOa) and the slope HCb (=YOb/YIb) at point (YIb, YOb), and the result is output as the correction coefficient HC(p).

Linear interpolation of the slopes HCa and HCb does not yield the exact slope of the line joining the origin (0, 0) to point (MI(p), MO(p)); there is a slight error, but the error is too small to be significant.

If the classes have a constant width, as described above, then when the slope is obtained by interpolation between the maximum value in a class and the maximum value of the adjacent class one level lower, that is, between the slopes (HCb, HCa) at the endpoints of the class, since the divisor used to calculate the slopes HCb and HCa (in the example above, (YIb−YIa)) has a fixed value, the circuit size can be reduced by using a multiplier or shifter instead of a divider. In particular, if the fixed value is a power of two ($2^m$, where m is an integer equal to or greater than 2), division can be replaced by bit shifting.

Instead of using equation (1) to interpolate the slope HC(p) between the slopes HCb and HCa, the value of MO(p) may be interpolated between the vertical coordinate values YOb and YOa, and the ratio of MO(p) to MI(p) may be output as the correction coefficient HC(p). In this case there is no error.

The operation for obtaining MO(p) by interpolation from YOb and YOa is given by the following equation (2).

$$MO(p)=YOa\times\{MI(p)-YIa\}/\{YIb-YIa\}+YOb\times\{YIb-MI(p)\}/\{YIb-YIa\} \quad (2)$$

The operation for calculating the correction coefficient HC(p) from MO(p) and MI(p) is given by the following equation (3).

$$HC(p)=MO(p)/MI(p) \quad (3)$$

The correction coefficient HC(p) obtained by either of the methods described above from the maximum component value MAX(RI(p), GI(p), BI(p))=CI(p) of the red, green, and blue primary color signals RI(p), GI(p), BI(p) for each pixel is supplied to the multipliers 16R, 16G, 16B, where the exemplary red, green, and blue primary color signals RI(p), GI(p), BI(p) input from the input terminals 10R, 10G, 10B are multiplied by the common correction coefficient HC(p).

Figure 5:
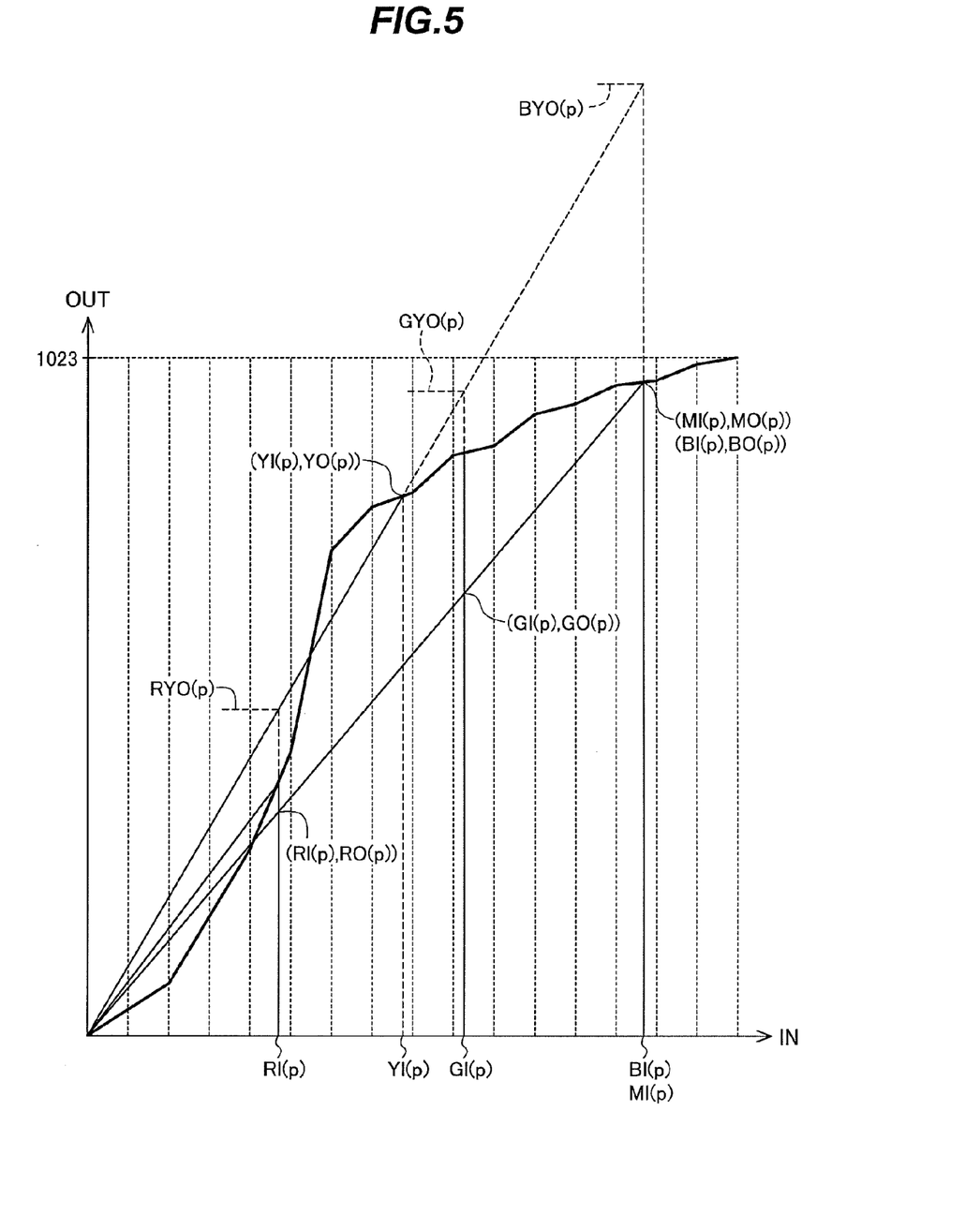
FIG. 5 is a graph illustrating pre-gradation-correction and post-gradation-correction gradation levels in the image processing apparatus in Embodiment 1.

The effect of the present invention will be described with reference to FIG. 5. The horizontal axis indicates luminance gradation YI and the gradation values of the red, green, and blue primary color signals RI, GI, and BI; the vertical axis indicates post-correction luminance gradation YO and the post-correction gradation values of the red, green, and blue primary color signals RO, GO, and BO. The solid broken line drawn from the lower left to the upper right is the gradation correction parameter decision curve. To make the effect of the invention more clear, a curve slightly different from the gradation correction parameter decision curve in FIG. 4 is shown.

The symbols RI(p), GI(p), BI(p) on the horizontal axis indicate the gradation values of the red, green, and blue signals for a given pixel (p) input from the input terminals 10R, 10G, 10B. YI(p) is the luminance gradation value calculated from the red, green, and blue gradation values RI (p), GI (p), and BI (p).

The maximum component value MAX(RI(p), GI(p), BI(p))=MI(p) for the given pixel (p) is BI(p). The correction parameter (correction coefficient) HC(p) is the ratio of the vertical coordinate MO(p) to the horizontal coordinate MI(p) of the gradation correction parameter decision curve at this horizontal coordinate value MI(p). The multipliers 16R, 16G, 16B multiply each of the primary color signal values RI(p), GI(p), BI(p) of the given pixel (p) by this correction coefficient HC(p).

The post-correction signal value BO(p) obtained by multiplying BI(p) by the correction coefficient HC(p) is equal to MO(p) and therefore cannot exceed the maximum gradation value (1023). The post-correction signal values RO(p) and GO(p) are obtained by multiplying RI(p) and GI(p) which are smaller than BI(p), by the same correction coefficient HC(p), so they are smaller than BI(p) and they also cannot exceed the maximum gradation value (1023).

$$RO(p)=HC(p)\times RI(p)$$

$$GI(p)=HC(p)\times GI(p)$$

If the ratio YO(p)/YI(p) of the vertical coordinate YO(p) to the horizontal coordinate YI(p) of the gradation correction parameter decision curve at the horizontal coordinate value equal to the luminance value YI(p) of the pixel is used as the correction coefficient for the pixel as in the prior art, multiplication of the pixel component values RI(p), GI(p), BI(p) by the ratio YO(p)/YI(p) yields the corrected values RYO(p), GYO(p), BYO(p) indicated by dotted lines. The BYO(p) value exceeds the maximum gradation value 1023. This results in color collapse, because values exceeding the maximum gradation value 1023 are limited to the maximum gradation value 1023 by a clipping circuit.

In Embodiment 1, since the gradation-scale correction table is constructed from the luminance distribution of the pixels in one frame, if the frame has generally low luminance, the gradation correction produces a brighter image with higher contrast. If the frame has generally high luminance, the gradation correction produces a higher-contrast image with crisper black colors.

Although the gradation-scale correction table used in the above example is generated from the luminance distribution, a similar effect can be produced if the gradation-scale correction table is generated from any other characteristic quantity. Since the gradation-scale correction table is read at the maximum component value for each pixel to obtain the gradation correction parameter for that pixel from the maximum gradation correction parameter decision curve, the post-correction color component values of the pixel never exceed the maximum gradation value, and no color collapse occurs.

The same effect can also be produced when the image signal has components other than the red, green, blue primary color components. If the correction parameter for each pixel is obtained by reading the gradation correction parameter decision curve at the maximum component value of the pixel, the corrected component values will always be within the maximum gradation value, and the gradation range will be used effectively without color collapse or white collapse.

In Embodiment 1, the unaltered cumulative histogram of the characteristic quantity is used as the gradation correction parameter decision curve to create the gradation-scale correction table, but it is also possible to generate the gradation correction parameter decision curve by altering the cumulative histogram values. The slope limitation mentioned above is one exemplary alteration. Other exemplary alterations will be described below.

Figure 6:
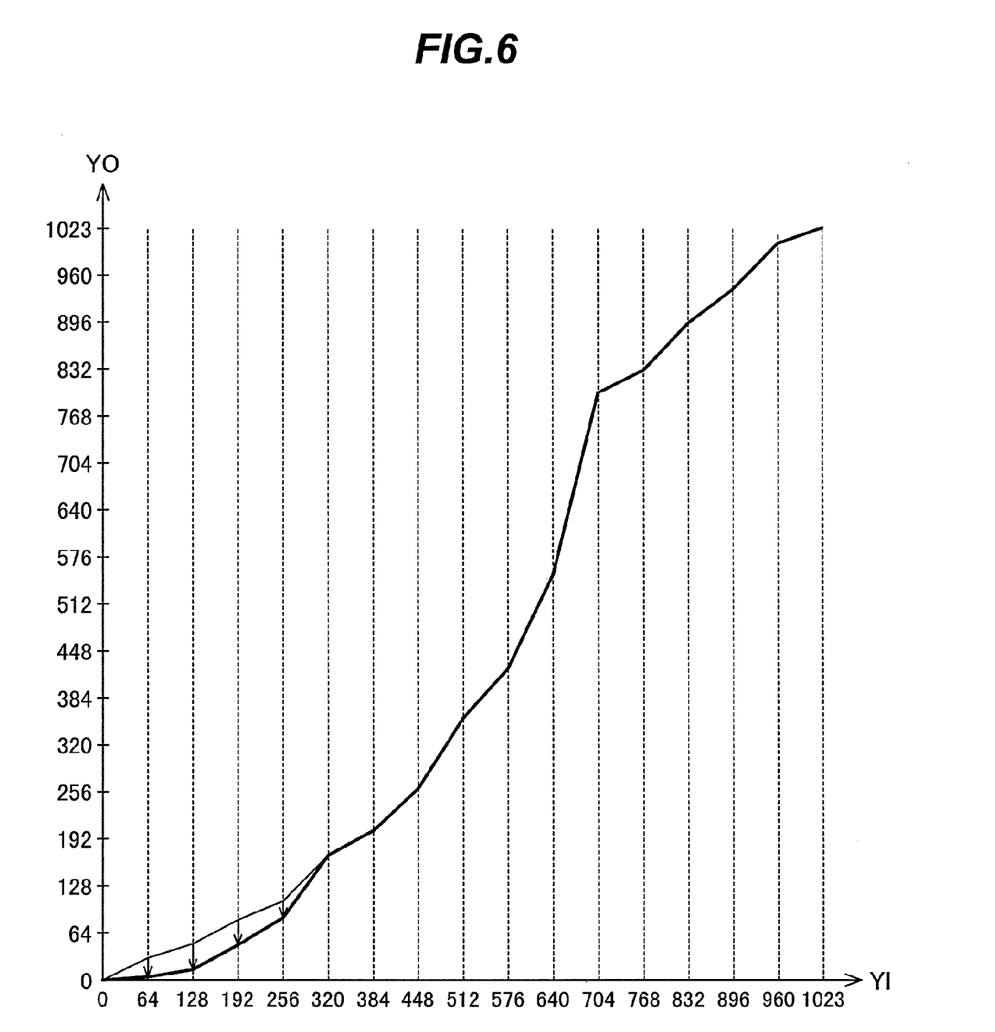
FIG. 6 is a graph showing another gradation correction parameter decision curve usable in Embodiment 1.

As shown in FIG. 6, an image with high average illumination, for example, can be corrected to produce crisper black colors by reducing the values of the gradation correction parameter decision curve in the lowest gradation region.

Figure 7:
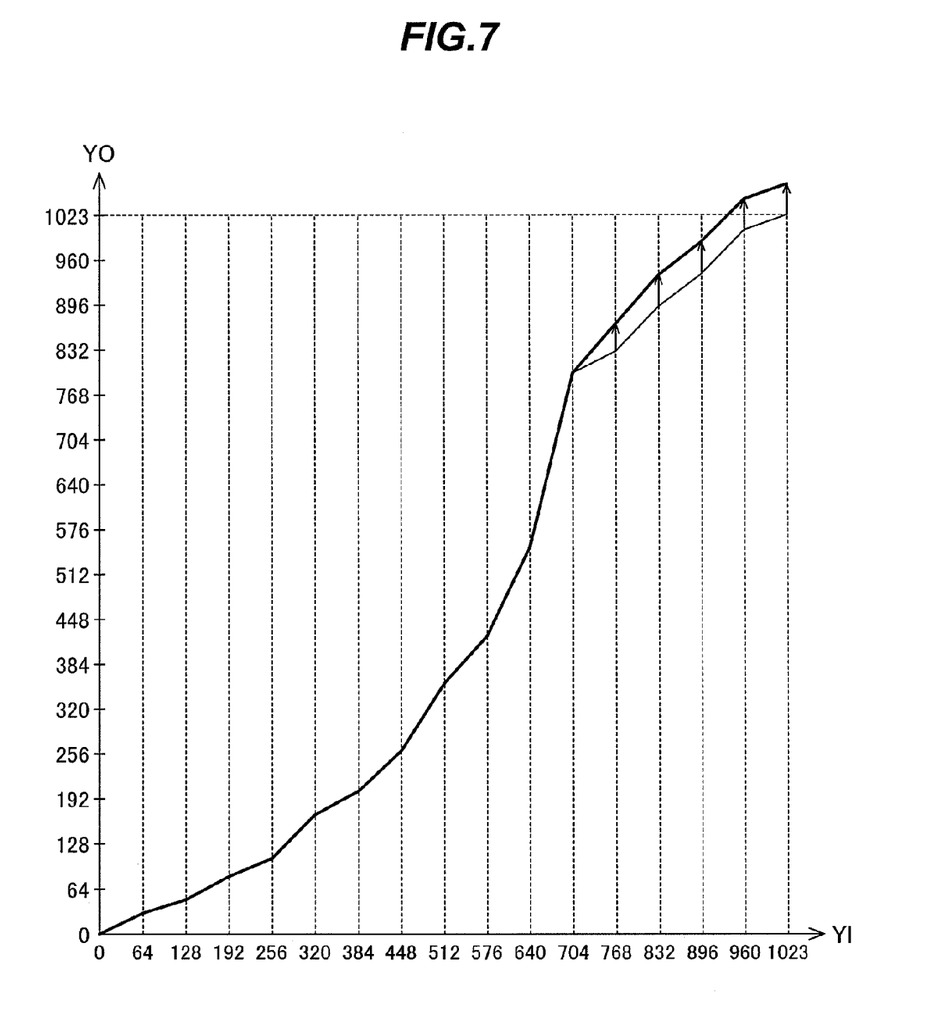
FIG. 7 is a graph showing still another gradation correction parameter decision curve usable in Embodiment 1.

If the values of the gradation correction parameter decision curve in the highest gradation region are increased as shown in FIG. 7, the image can be brightened. In this case, some output values may exceed the maximum gradation value (1023), and may have to be clipped to the maximum gradation value (1023), causing slight color collapse, but the large color collapse seen in the prior art (e.g., BYO(p) in FIG. 5) will never occur. Compared to the advantage of being able to obtain consistently brighter images, the disadvantage of producing a slight color collapse or white collapse (in which bright white colors are displayed with no gradation difference) is negligible. In practice, this alteration has a large beneficial effect.

Figure 8:
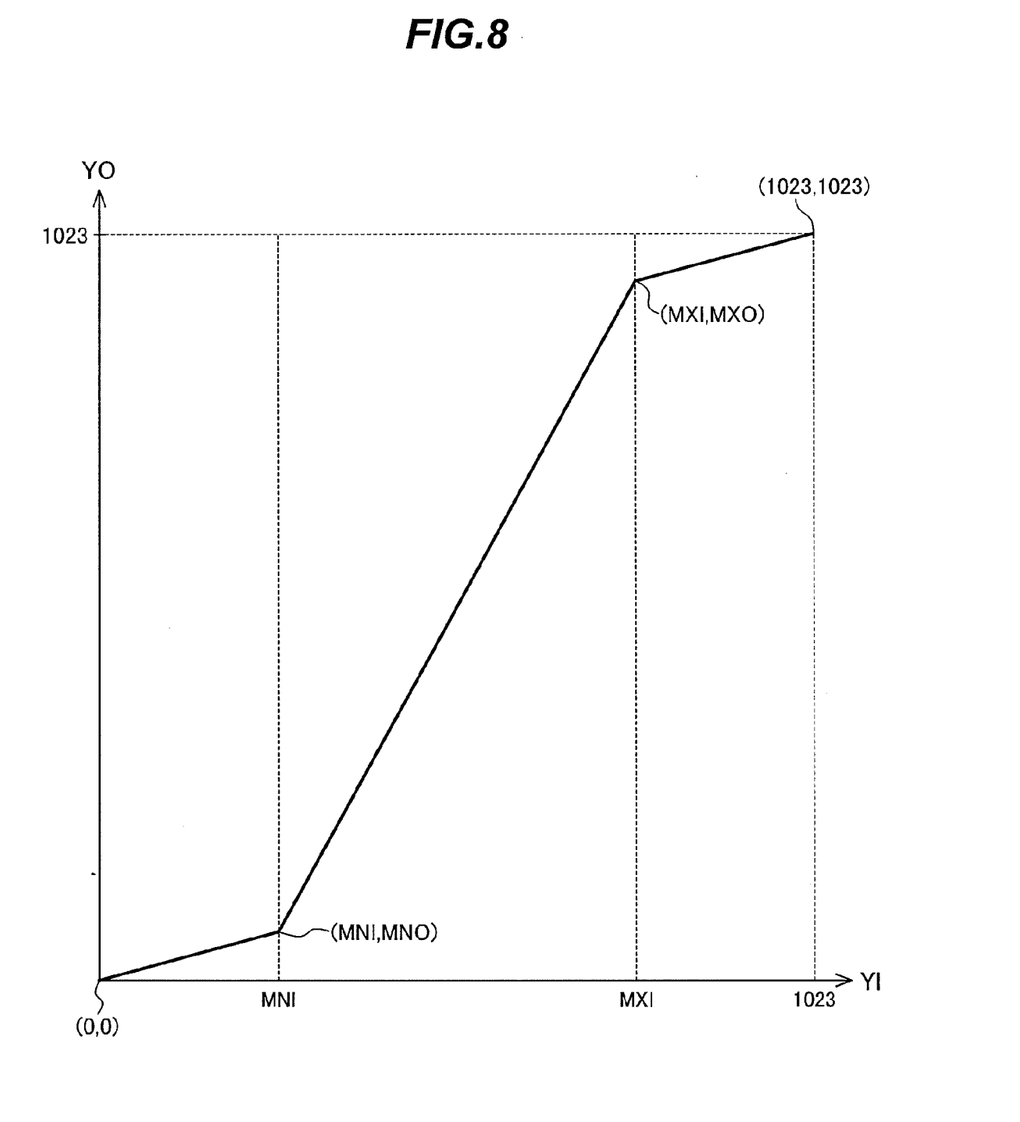
FIG. 8 is a graph showing yet another gradation correction parameter decision curve usable in Embodiment 1.

It is also possible to simplify the gradation-scale correction table as shown in FIG. 8, by plotting the gradation correction parameter decision curve as a broken line consisting of three straight segments. One segment connects a first point (MNI, MNO) to a second point (MXI, MXO). Another segment connects the first point (MNI, MNO) to the origin (0, 0). The third segment connects the second point (MXI, MXO) to the maximum point (1023, 1023). The horizontal coordinate MNI of the first point may be the minimum gradation value of the pixels in one screen or frame, or an equivalent value; the vertical coordinate MNO of the first point is the corresponding post-correction value. The horizontal coordinate value MXI of the second point may be the maximum gradation value of the pixels in the one screen or frame, or an equivalent value; the vertical axis coordinate value MXO of the second point is the corresponding post-correction value. The maximum horizontal and vertical coordinates are the pre-correction maximum gradation value (1023) and the corresponding post-correction gradation value (1023).

In FIG. 8, MNO is set to substantially one-sixteenth of the maximum value, and MNI is selected so that one-sixteenth of the pixels in the frame have luminance values equal to or less than MNI, as determined from the luminance histogram distribution. Similarly, MXO is set to substantially fifteen-sixteenths of the maximum value, and MXI is selected so that one-sixteenth of the pixels in the frame have luminance values equal to or greater than MXI.

This simplification improves contrast while reducing circuit size.

Embodiment 2

The image processing apparatus according to Embodiment 2 will now be described with reference to FIG. 9. The structure of the image processing apparatus differs from the image processing apparatus in FIG. 1 only in that the characteristic quantity calculator 11 and characteristic quantity distribution extractor 12 are replaced with a maximum value distribution extractor 18.

Figure 9:
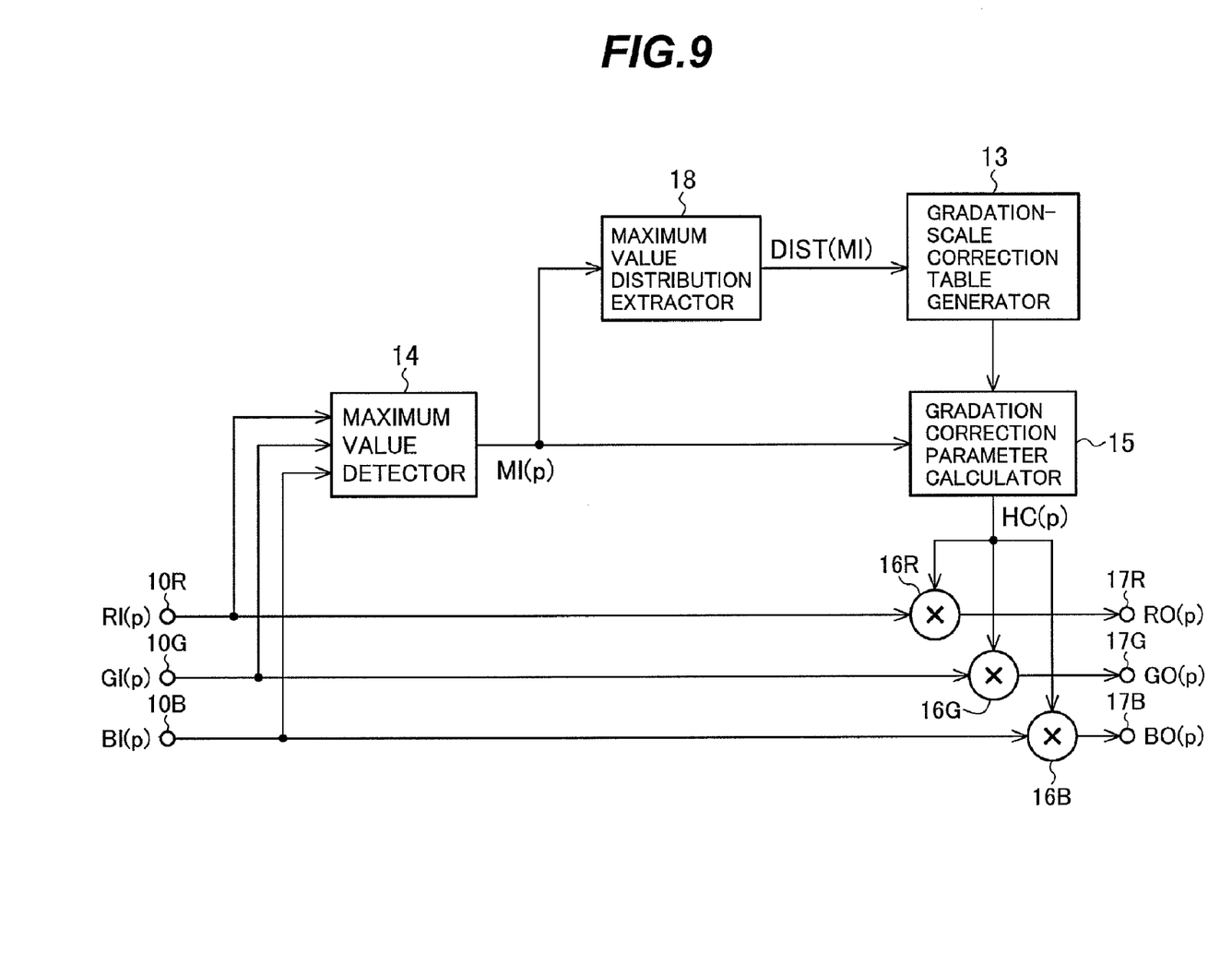
FIG. 9 is a block diagram illustrating the structure of an image processing apparatus according to Embodiment 2.

In the image processing apparatus in FIG. 9, the maximum value detector 14 can be regarded as performing the functions of the characteristic quantity calculator 11 in FIG. 1, and the maximum value distribution extractor 18 can be regarded as an instance of the characteristic quantity distribution extractor 12 in FIG. 1. The characteristic quantity calculator 11 in Embodiment 1 calculates an arbitrary characteristic quantity from the primary color signals for each pixel and the characteristic quantity distribution extractor 12 extracts the distribution of the characteristic quantity. Luminance was used as an exemplary characteristic quantity in the description of Embodiment 1. In Embodiment 2, the maximum component value MAX(RI(p), GI(p), BI(p))=MI(p) of the input primary color signals RI(p), GI(p), BI(p) for each pixel (p) is used as the characteristic quantity. The maximum component value for each pixel is determined by the maximum value detector 14, which therefore also functions as (is equivalent to) the characteristic quantity calculator.

The maximum component value MI(p) detected by the maximum value detector 14 is supplied to the maximum value distribution extractor 18 and the gradation correction parameter calculator 15.

The maximum value distribution extractor 18 extracts the distribution DIST(MI) of the maximum component value MI(p) of each input pixel over one screen (one frame). The extracted distribution is supplied to the gradation-scale correction table generator 13.

From the distribution DIST(MI) of maximum component values, the gradation-scale correction table generator 13 generates a gradation-scale correction table that stores data representing a gradation correction parameter decision curve. The data are stored at addresses representing maximum component values MI(p).

The gradation correction parameter decision curve relates the maximum component values MI(p) of the pixels before gradation correction to the maximum component values MO(p) of the pixels after the gradation correction.

The gradation-scale correction table generator 13, the gradation correction parameter calculator 15, and the multipliers 16R, 16G, 16B have the same functions as in Embodiment 1.

Embodiment 2 produces effects similar to the effects of Embodiment 1.

In addition, since the maximum component value is used as the characteristic quantity, the gradation range can be exploited more fully.

More specifically, if the correction parameters are determined by a gradation correction parameter decision curve plotted from the maximum component values in Embodiment 2, and from a characteristic quantity (such as luminance) other than the maximum component value in Embodiment 1, then the correction parameters will attain larger values in Embodiment 2 than in Embodiment 1, producing greater post-correction gradation values, while still avoiding color collapse.

Because the maximum value detector 14 also operates as the characteristic quantity calculator, Embodiment 2 has a simpler circuit configuration than Embodiment 1.

Embodiment 2 also permits variations similar to those described in Embodiment 1.

Embodiments 1 and 2 have been described in relation to a ten-bit digital signal providing 1024 gradation levels from 0 to 1023, but the number of the gradation levels is not limited to this value.

Those skilled in the art will recognize that further variations are possible within the scope of the invention, which is defined in the appended claims.

What is claimed is:

1. An image processing apparatus for processing an image signal representing a plurality of pixels, the image signal having a plurality of component values for each pixel, the image processing apparatus comprising:
    a maximum component value detector for detecting, for each pixel, a maximum value among the plurality of component values of the input image signal;
    a distribution extractor for extracting a distribution from the input image signal over a predetermined period;
    a gradation-scale correction table generator for generating a gradation-scale correction table from the distribution, the gradation-scale correction table representing a gradation correction parameter decision curve;
    a gradation correction parameter calculator for calculating a gradation-scale correction parameter for each pixel from the maximum component value of the pixel by referring to the gradation-scale correction table; and
    a multiplier for multiplying the plurality of component values of the pixel by the gradation correction parameter.

2. The image processing apparatus of claim 1, wherein the gradation correction parameter calculator outputs, as the gradation correction parameter, a ratio MO/MI, where MO and MI are coordinates of a point on the gradation correction parameter decision curve, MI being the maximum component value of the pixel.

3. The image processing apparatus of claim 1, wherein the distribution extractor extracts the distribution of a characteristic quantity of the pixels in the predetermined period.

4. The image processing apparatus of claim 3, wherein the characteristic quantity is a luminance value.

5. The image processing apparatus of claim 3, wherein the characteristic quantity is the maximum component value.

6. The image processing apparatus of claim 3, wherein:
    the distribution extractor constructs, as said distribution, a histogram of the characteristic quantity; and
    the gradation-scale correction table generator converts the histogram to a cumulative histogram normalized to reach a total frequency value equal to a maximum possible value of the characteristic quantity, the gradation-scale correction table being a table of values substantially equal to values of the cumulative histogram.

7. The image processing apparatus of claim 6, wherein the cumulative histogram represents cumulative frequencies of classes representing successive ranges of values of the characteristic quantity, and the gradation-scale correction table stores, for each class among the classes, a cumulative frequency of the characteristic quantity up to a largest value in the class.

8. The image processing apparatus of claim 7, wherein the gradation correction parameter calculator performs interpolation on successive values in the gradation-scale correction table to obtain intermediate values on the gradation correction parameter decision curve.

9. The image processing apparatus of claim 1, wherein the gradation correction parameter decision curve increases to a maximum value equal to a greatest possible value of the maximum component value.

10. The image processing apparatus of claim 1, wherein the gradation correction parameter decision curve increases to a maximum value exceeding a greatest possible value of the maximum component value.

11. The image processing apparatus of claim 1, wherein the gradation correction parameter decision curve is a broken line consisting of just three straight segments.

12. The image processing apparatus of claim 1, wherein the plurality of component values for each pixel represent red, green, and blue.

13. The image processing apparatus of claim 1, wherein the image signal is divided into successive frames, and the predetermined period is one frame.

* * * * *